United States Patent
Worden et al.

(10) Patent No.: US 10,938,729 B1
(45) Date of Patent: Mar. 2, 2021

(54) USING SELF-DEGRADATION IN DYNAMIC SPECTRUM ALLOCATION

(71) Applicant: Rockwell Collins, Inc., Cedar Rapids, IA (US)

(72) Inventors: Ian R. Worden, Marion, IA (US); T J T. Kwon, Marion, IA (US); Thomas L. Tapp, Cedar Rapids, IA (US); Scott A. Bailey, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 27 days.

(21) Appl. No.: 16/540,564

(22) Filed: Aug. 14, 2019

(51) Int. Cl.
- *H04L 12/857* (2013.01)
- *H04L 12/927* (2013.01)
- *H04L 12/725* (2013.01)
- *H04L 12/761* (2013.01)

(52) U.S. Cl.
CPC .......... *H04L 47/2491* (2013.01); *H04L 45/16* (2013.01); *H04L 45/302* (2013.01); *H04L 47/805* (2013.01)

(58) Field of Classification Search
CPC ... H04L 47/2491; H04L 45/16; H04L 45/302; H04L 47/805
See application file for complete search history.

(56) References Cited

U.S. PATENT DOCUMENTS

| | | | |
|---|---|---|---|
| 8,755,269 B2 | 6/2014 | Jollota | |
| 2003/0231621 A1 | 12/2003 | Gubbi et al. | |
| 2011/0152970 A1 | 6/2011 | Jollota et al. | |
| 2017/0099129 A1* | 4/2017 | Buthler | H04L 5/0057 |

* cited by examiner

*Primary Examiner* — Ronald B Abelson
(74) *Attorney, Agent, or Firm* — Suiter Swantz pc llo

(57) ABSTRACT

A communication node of a multi-node communication network may include a communication interface and a controller communicatively coupled to the communication interface. The controller may be configured to: transmit one or more data packets over an in-use channel to one or more additional communication nodes of the multi-node communication network; determine an in-use channel quality indicator (CQI) value ($CQI_{in\text{-}use}$) of the in-use channel; determine a self-degradation value (SDV) indicative of channel quality degradation attributable to the multi-node communication network; determine a candidate CQI value ($CQI_{candidate}$) of an identified candidate channel different from the in-use channel; determine a first CQI difference value ($CQI_{1diff}$); transmit one or more data packets over the in-use channel if $CQI_{1diff}$ does not exceed a CQI threshold value ($CQI_{thresh}$); and transmit one or more data packets over the candidate channel if $CQI_{1diff}$ exceeds $CQI_{thresh}$.

15 Claims, 4 Drawing Sheets

US 10,938,729 B1

USING SELF-DEGRADATION IN DYNAMIC SPECTRUM ALLOCATION

BACKGROUND

Dynamic Spectrum Allocation (DSA) refers to a set of techniques used in multi-node communication networks to analyze and/or utilize alternative communication channels which may exhibit improved performance (e.g., less noise, less jamming). DSA techniques typically involve analyzing performance metrics of an in-use channel (e.g., channel quality), as well as performance metrics of one or more candidate channels. By determining whether one or more candidate channels would exhibit improved channel quality/performance, DSA techniques enable communication nodes of a multi-node communication network to identify and transfer (e.g., "migrate") to alternative channels in order to improve the overall performance of the multi-node communication network.

Traditional DSA techniques evaluate the channel quality of one or more candidate channels in order to identify whether data transmissions should be carried out on a candidate channel. However, traditional DSA techniques fail to identify and consider degradations of channel quality of the in-use channel which are attributable to the multi-node communication network itself (e.g., self-degradation). Channel migration decisions depend on both the channel quality of the one or more candidate channels and the self-degradation of the in-use channel which is attributable to the multi-node communication network itself. In this regard, by ignoring self-degradation effects, traditional DSA techniques may result in underestimating the channel quality of the in-use channel, thereby leading to excessive and/or unnecessary channel migrations which do not improve the overall effectiveness of the multi-node communication network.

Therefore, it would be desirable to provide a system and method that cure one or more of the shortfalls of the previous approaches identified above.

SUMMARY

A communication node of a multi-node communication network is disclosed. In embodiments, the communication node may include a communication interface and a controller communicatively coupled to the communication interface. The controller may be configured to: transmit one or more data packets, via the communication interface, over an in-use channel to one or more additional communication nodes of the multi-node communication network; determine an in-use channel quality indicator (CQI) value ($CQI_{in-use}$) of the in-use channel at a first time; determine a self-degradation value (SDV) indicative of channel quality degradation attributable to the multi-node communication network; determine a candidate CQI value ($CQI_{candidate}$) of an identified candidate channel different from the in-use channel; determine a first CQI difference value ($CQI_{1diff}$) at the first time, wherein $CQI_{1diff}$ includes at least one of a difference between $CQI_{in-use}$ and an adjusted candidate CQI value ($CQI_{ADJ\ candidate}$) of the candidate channel, or a difference between $CQI_{candidate}$ and an adjusted in-use CQI value ($CQI_{ADJ\ in-use}$) of the in-use channel; transmit one or more data packets, via the communication interface, over the in-use channel to the one or more additional communication nodes of the multi-node communication network if $CQI_{1diff}$ does not exceed a CQI threshold value ($CQI_{thresh}$); and transmit one or more data packets, via the communication interface, over the candidate channel to the one or more additional communication nodes of the multi-node communication network if $CQI_{1diff}$ exceeds $CQI_{thresh}$.

In some embodiments of the communication node, the in-use channel is distinguishable from the candidate channel via at least one of a frequency, a modulation method, or a key.

In some embodiments of the communication node, $CQI_{ADJ\ in-use} = CQI_{in-use} + SDV$.

In some embodiments of the communication node, $CQI_{ADJ\ candidate} = CQI_{candidate} - SDV$.

In some embodiments of the communication node, $CQI_{1diff} = CQI_{ADJ\ candidate} - CQI_{in-use}$.

In some embodiments of the communication node, $CQI_{1diff} = CQI_{candidate} - CQI_{ADJ\ in-use}$.

In some embodiments of the communication node, the communication node further includes a memory configured to store at least one of the $CQI_{in-use}$ value, SDV, or the $CQI_{candidate}$ value.

In some embodiments of the communication node, $CQI_{in-use}$ is based on at least one of a density of the multi-node communication network, a traffic profile of the multi-node communication network, a packet error rate, a channel utilization metric, or a radio frequency (RF) energy level.

In some embodiments of the communication node, the controller is further configured to: receive an additional candidate CQI value ($CQI_{2candidate}$) of an additional candidate channel from an additional communication node of the one or more additional communication nodes of the multi-node communication network; determining a second CQI difference value ($CQI_{2\ diff}$), wherein $CQI_{2\ diff}$ includes at least one of a difference between $CQI_{in-use}$ and an adjusted candidate CQI value ($CQI_{2\ ADJ\ candidate}$) of the additional candidate channel, or a difference between a CQI value of the additional candidate channel ($CQI_{candidate}$) and the adjusted in-use CQI value ($CQI_{ADJ\ in-use}$) of the in-use channel, transmit one or more data packets over the in-use channel to the one or more additional communication nodes of the multi-node communication network if $CQI_{2diff}$ does not exceed $CQI_{thresh}$; and transmit one or more data packets over the additional candidate channel to the one or more additional communication nodes of the multi-node communication network if $CQI_{2diff}$ exceeds $CQI_{thresh}$.

In some embodiments of the communication node, the controller is further configured to: determine an in-use CQI value ($CQI_{in-use}$) of the first channel at a second time subsequent to the first time; determine a candidate channel CQI value ($CQI_{candidate}$) of the candidate channel at the second time; determine the first CQI difference value ($CQI_{1diff}$) at the second time; transmit one or more data packets over the in-use channel to the one or more additional communication nodes of the multi-node communication network if $CQI_{1diff}$ at the second time does not exceed $CQI_{thresh}$; and transmit one or more data packets over the candidate channel to the one or more additional communication nodes of the multi-node communication network if $CQI_{1diff}$ at the second time exceeds $CQI_{thresh}$.

In some embodiments of the communication node, determining a self-degradation value (SDV) indicative of channel quality degradation attributable to the multi-node communication network includes: estimating a traffic value, t, attributable to traffic of the multi-node communication network; determining a channel quality difference estimation, $\delta_1$, between a first channel and a second channel, wherein $\delta$ includes a difference between a CQI value of the first channel ($CQI_1$) and a CQI value of the second channel (CQI$_2$); determining an adjusted channel quality difference estimation, $\delta'_1$, between the first channel and the second channel, wherein $\delta'_1=\delta_1-(t*\omega)$, wherein $\omega$ includes a self-degradation weight value; adjusting a transmission frequency to change from the first channel to the second channel; and determining if the second channel is a better channel for transmitting data within the multi-node communication network than the first channel.

In some embodiments of the communication node, the controller is further configured to: adjust $\omega$ if the controller determines the second channel is not better than the first channel to generate an adjusted self-degradation weight value, $\omega'$; determine a channel quality difference estimation, $\delta_2$, between the second channel and a third channel, wherein $\delta_2$ includes a difference between CQI$_2$ and a CQI value of the third channel (CQI$_3$); determine an adjusted channel quality difference, $\delta'_2$, between the second channel and the third channel, wherein $\delta'_2=\delta_2-(t*\omega')$; adjust a transmission frequency to change from the second channel to the third channel; and determine if the third channel is a better channel for transmitting data within the multi-node communication network than the second channel.

In some embodiments of the communication node, the controller is further configured to: adjust $\omega'$ if the controller determines the third channel is not better than the second channel to generate an adjusted self-degradation weight value, $\omega''$.

In some embodiments of the communication node, adjusting $\omega$ to generate an adjusted self-degradation weight value, $\omega'$, includes increasing $\omega$ to generate the adjusted self-degradation weight value, $\omega'$, such that $\omega'>\omega$.

A method for transmitting data within a multi-node communication network is disclosed. In embodiments, the method may include: transmitting one or more data packets over an in-use channel between communication nodes of a multi-node communication network; determining an in-use channel quality indicator (CQI) value (CQI$_{in\text{-}use}$) of the in-use channel; determining a self-degradation value (SDV) indicative of channel quality degradation attributable to the multi-node communication network; identifying one or more candidate channels different from the in-use channel; determining one or more candidate CQI values (CQI$_{candidate}$) of the one or more candidate channels; determining a first CQI difference value (CQI$_{1diff}$), wherein CQI$_{1diff}$ includes at least one of a difference between CQI$_{in\text{-}use}$ and an adjusted candidate CQI value (CQI$_{ADJ\ candidate}$) of the candidate channel, or a difference between CQI$_{candidate}$ and an adjusted in-use CQI value (CQI$_{ADJ\ in\text{-}use}$) of the in-use channel; transmitting one or more data packets over the in-use channel to the one or more additional communication nodes of the multi-node communication network if CQI$_{1diff}$ does not exceed a CQI threshold value (CQI$_{thresh}$); and transmitting one or more data packets over the candidate channel to the one or more additional communication nodes of the multi-node communication network if CQI$_{1diff}$ exceeds CQI$_{thresh}$.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
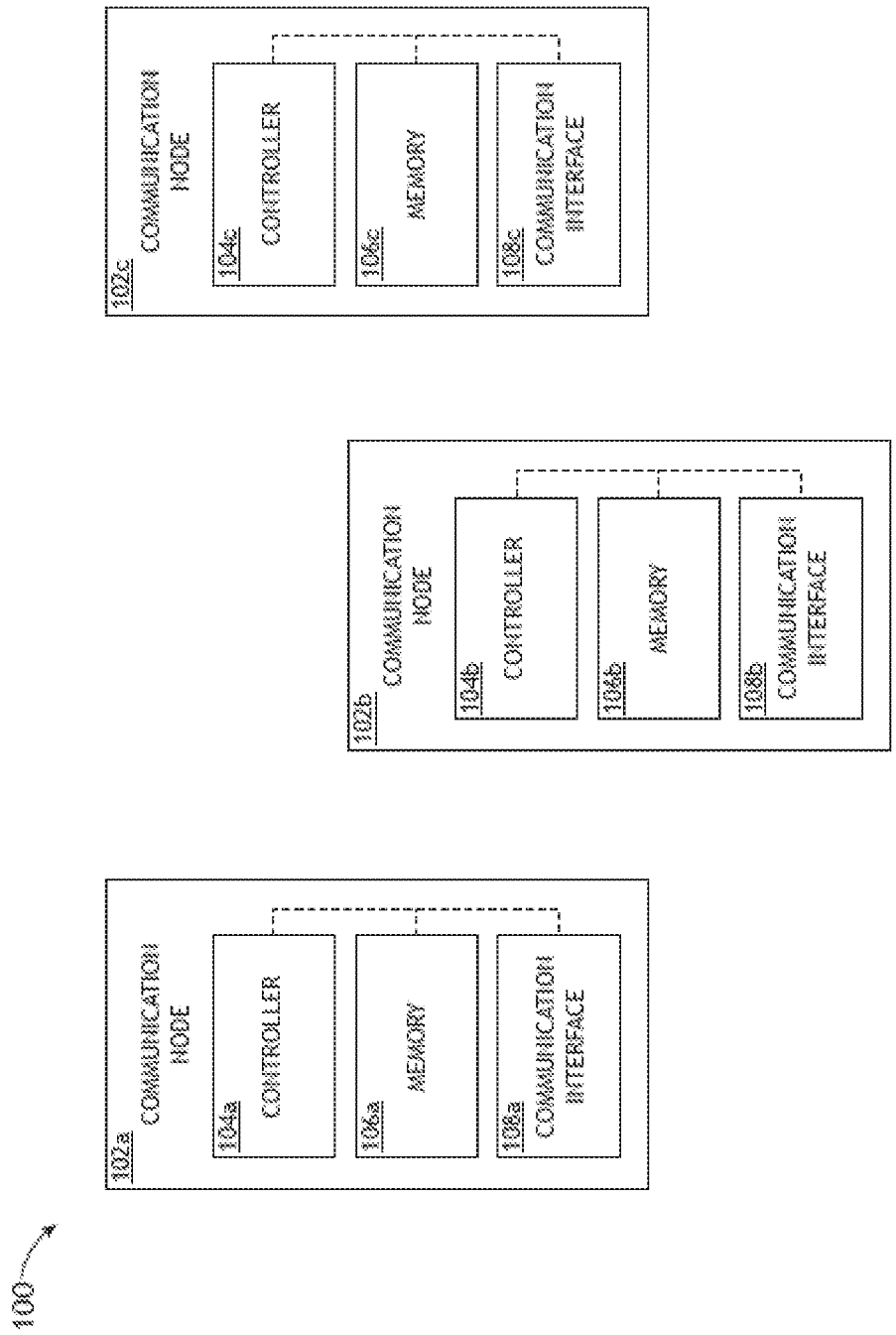
FIG. 1 illustrates a multi-node communication network for utilizing self-degradation to perform dynamic spectrum allocation (DSA), in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Dynamic Spectrum Allocation (DSA) refers to a set of techniques used in multi-node communication networks to analyze and/or utilize alternative communication channels which may exhibit improved performance (e.g., less noise, less jamming). DSA techniques typically involve analyzing performance metrics of an in-use channel (e.g., channel quality), as well as performance metrics of one or more candidate channels. By determining whether one or more candidate channels would exhibit improved channel quality/performance, DSA techniques enable communication nodes of a multi-node communication network to identify and transfer to alternative channels in order to improve the overall performance of the multi-node communication network.

Traditional DSA techniques evaluate the channel quality of one or more candidate channels in order to identify whether data transmissions should be carried out on a candidate channel. However, traditional DSA techniques fail to identify and consider degradations of channel quality of the in-use channel which are attributable to the multi-node communication network itself (e.g., self-degradation). Channel migration decisions depend on both the channel quality of the one or more candidate channels and the self-degradation of the in-use channel which is attributable to the multi-node communication network itself. In this regard, by ignoring self-degradation effects, traditional DSA techniques may result in underestimating the channel quality of the in-use channel, thereby leading to excessive and/or unnecessary channel migrations which do not improve the overall effectiveness of the multi-node communication network.

For example, by failing to determine self-degradation effects (e.g., traffic, congestion, delay) attributable to the multi-node communication network itself, the traditional DSA techniques may underestimate the channel quality of the currently in-use channel and/or overestimate the post-migration quality of the candidate channel. These traditional DSA techniques may thereby determine a candidate channel may exhibit improved channel quality, and implement a channel migration to the candidate channel. However, by underestimating the channel quality of the in-use channel, the channel migration may result in no net improvements in channel quality. Moreover, due to added overhead and management processing associated with the channel migration, the unnecessary channel migration may actually result in a net decrease in the overall effectiveness of the multi-node communication network. Communication nodes lost throughout the channel migration may further decrease the overall effectiveness of the multi-node communication network. Through this example, it may be appreciated that traditional DSA techniques may result in unnecessary channel migrations, which may actually decrease the effectiveness of a multi-node communication network.

Accordingly, embodiments of the present disclosure are directed to a system and method which cure one or more of the shortfalls of previous DSA techniques identified above. Embodiments of the present disclosure are directed to a multi-node communication network configured to determine self-degradation values indicative of channel quality degradation effects attributable to the multi-node communication network in order to carry out dynamic spectrum allocation (DSA). Additional embodiments of the present disclosure are directed to determining adjusted in-use channel quality indicator (CQI) values or candidate CQI values in order to make informed channel migration decisions. Further embodiments of the present disclosure are directed to a system and method for estimating a traffic value and/or self-degradation value of a multi-node communication network in order to improve channel migration decisions with DSA techniques.

FIG. 1 illustrates a multi-node communication network 100 for utilizing self-degradation to perform dynamic spectrum allocation (DSA), in accordance with one or more embodiments of the present disclosure. In embodiments, the multi-node communication network 100 may include a plurality of communication nodes 102. For example, the multi-node communication network 100 may include a first communication node 102a, a second communication node 102b, and a third communication node 102c.

The multi-node communication network 100 may include any multi-node communication network known in the art. For example, the multi-node communication network 100 may include a mobile ad-hoc network (MANET) in which each communication node 102 within the multi-node communication network is able to move freely and independently. Similarly, the one or more communication nodes 102 may include any communication node known in the art which may be communicatively coupled. In this regard, the one or more communication nodes 102 may include any communication node known in the art for transmitting/transceiving data packets. For example, the one or more communication nodes 102 may include, but are not limited to, radios, mobile phones, smart phones, tablets, smart watches, laptops, and the like.

Each communication node 102 of the one or more communication nodes 102a, 102b, 102c may include, but is not limited to, a respective controller 104 (e.g., controller 104a, 104b, 104c, etc.), memory 106 (e.g., memory 106a, 106b, 106c, etc.), and communication interface 108 (e.g., communication interface 108a, 108b, 108c, etc.).

The controller 104 provides processing functionality for at least the communication node 102 and can include any number of processors, micro-controllers, circuitry, field programmable gate array (FPGA) or other processing systems, and resident or external memory for storing data, executable code, and other information accessed or generated by the communication node 102. The controller 104 can execute one or more software programs embodied in a non-transitory computer readable medium (e.g., memory 106) that implement techniques described herein. The controller 104 is not limited by the materials from which it is formed or the processing mechanisms employed therein and, as such, can be implemented via semiconductor(s) and/or transistors (e.g., using electronic integrated circuit (IC) components), and so forth.

The memory 106 can be an example of tangible, computer-readable storage medium that provides storage functionality to store various data and/or program code associated with operation of the communication node 102/controller 104, such as software programs and/or code segments, or other data to instruct the controller 104, and possibly other components of the communication node 102, to perform the functionality described herein. Thus, the memory 106 can store data, such as a program of instructions for operating the communication node 102, including its components (e.g., controller 104, communication interface 108, etc.), and so forth. It should be noted that while a single memory 106 is described, a wide variety of types and combinations of memory (e.g., tangible, non-transitory memory) can be employed. The memory 106 can be integral with the controller 104, may comprise stand-alone memory, or may be a combination of both. Some examples of the memory 106 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 108 can be operatively configured to communicate with components of the communication node 102. For example, the communication interface 108 can be configured to retrieve data from the controller 104 or other devices (e.g., other nodes 102), transmit data for storage in the memory 106, retrieve data from storage in the memory 106, and so forth. The communication interface 108 can also be communicatively coupled with the controller 104 to facilitate data transfer between components of the communication node 102 and the controller 104. It should be noted that while the communication interface 108 is described as a component of the communication node 102, one or more components of the communication interface 108 can be implemented as external components communicatively coupled to the communication node 102 via a wired and/or wireless connection. The communication node 102 can also include and/or connect to one or more input/output (I/O) devices. In embodiments, the communication interface 108 includes or is coupled to a transmitter, receiver, transceiver, physical connection interface, or any combination thereof.

It is contemplated herein that the communication interface 108 of a communication node 102 may be configured to communicatively couple to additional communication interfaces 108 of additional communication nodes 102 of the multi-node communication network 100 using any wireless communication techniques known in the art including, but not limited to, GSM, GPRS, CDMA, EV-DO, EDGE, WiMAX, 3G, 4G, 4G LTE, 5G, WiFi protocols, RF, LoRa, and the like.

In embodiments, the controller 104 of a communication node 102 is configured to carry out various steps and functions of the present disclosure. The controller 104 may be configured to: transmit one or more data packets, via the communication interface 108, over an in-use channel to one or more additional communication nodes 102 of the multi-node communication network 100; determine an in-use channel quality indicator (CQI) value ($CQI_{in\text{-}use}$) of the in-use channel; determine a self-degradation value (SDV) indicative of channel quality degradation attributable to the multi-node communication network 100; determine a candidate CQI value ($CQI_{candidate}$) of an identified candidate channel different from the in-use channel; determine a first CQI difference value ($CQI_{1diff}$), wherein $CQI_{1diff}$ comprises at least one of a difference between $CQI_{in\text{-}use}$ and an adjusted candidate CQI value ($CQI_{ADJ\ candidate}$) of the candidate channel, or a difference between $CQI_{can}$ and an adjusted in-use CQI value ($CQI_{ADJ\ in\text{-}use}$) of the in-use channel; transmit one or more data packets, via the communication interface 108, over the in-use channel to the one or more additional communication nodes 102 of the multi-node communication network 100 if $CQI_{1diff}$ does not exceed a CQI threshold value ($CQI_{thresh}$); and transmit one or more data packets, via the communication interface 108, over the candidate channel to the one or more additional communication nodes 102 of the multi-node communication network 100 if $CQI_{1diff}$ exceeds $CQI_{thresh}$. Each of these steps/functions of the controller 104 will be address in further detail herein.

In embodiments, a controller 104 of a multi-node communication network 100 may be configured to transmit one or more data packets, via the communication interface 108, over an in-use channel to one or more additional communication nodes 102 of the multi-node communication network 100. For example, as shown in FIG. 1, each communication node 102a-102c of the multi-node communication network 100 may be configured to transmit data packets, via a respective communication interfaces 108a-108c, to various other communication nodes 102a-102c over a first channel. Similarly, each communication node 102a-102c may be configured to receive data packets over the first channel. The term "in-use channel" may be used to refer to the channel on which the multi-node communication network 100 is currently transmitting and/or receiving data packets, whereas "candidate channel" may be used to refer to a channel other than the in-use channel.

For the purposes of the present disclosure, the term "channel" may be defined by a unique set of characteristics (e.g., configuration of bandwidths, modulation methods keys, and the like) with which two or more communication nodes 102 may communicate. For instance, a first channel may be defined as transmission/reception within a first bandwidth, and a second channel may be defined as transmission/reception within a second bandwidth different from the first bandwidth. By way of another example, a first channel may be defined as transmission/reception utilizing a first modulation method, and a second channel may be defined as transmission/reception utilizing a second modulation method different from the first modulation method. It is contemplated herein that the present disclosure may utilize characteristic known in the art to separate/distinguish channels such that the channels do not interfere with one another. Thus, the in-use channel may be distinguishable from a candidate channel via one or more characteristics including, but not limited to, a frequency, a modulation method, a key, and the like.

In embodiments, the controller 104 may be configured to determine an in-use channel quality indicator (CQI) value ($CQI_{in\text{-}use}$) of the in-use channel. CQI values of the present disclosure may include any value, metric, or other indicator which is indicative of a quality of the respective channel. For example, CQI values of the present disclosure (e.g., $CQI_{in\text{-}use}$, and the like)) may be represented as a noise factor (NF) value.

It is contemplated herein that the controller 104 may be configured to determine CQI values (e.g., $CQI_{in\text{-}use}$) based on any number of factors including, but not limited to, inbound/outbound traffic logs, traffic patterns, a traffic profile of the multi-node communication network, a channel utilization metric, packet error rates, identified delays, radio frequency (RF) energy levels, and the like. By way of another example, determined CQI values (e.g., $CQI_{in\text{-}use}$) may be based on a known and/or determined topology of the multi-node communication network 100, a density of the multi-node communication network 100, an average traffic experienced by each communication node of the multi-node communication network 100, and the like. Characteristics contributing to CQI values (e.g., $CQI_{in\text{-}use}$) may be determined by referencing routing tables and/or neighboring lists stored in memory 106 of the communication nodes 102a-

102c of the multi-node communication network 100. Furthermore, channel acquire statistics (e.g., channel collision statistics) acquired throughout carrier sense multiple access (CSMA) communication protocols may be used to determine CQI values of the present disclosure.

It is further contemplated herein that other transmitting devices and/or other multi-node communication networks may be utilizing the same channel (e.g., in-use channel) at the same time as the multi-node communication network 100. In this regard, CQI values (e.g., $CQI_{in-use}$) may be based on factors attributable to outside sources including, but not limited to, overheard traffic, outside jamming effects, noise, and the like.

In embodiments, the controller 104 is configured to determine a self-degradation value (SDV) indicative of channel quality degradation effects attributable to the multi-node communication network 100. In this regard, SDV may be indicative of noise, traffic, delay, congestion, and the like, which are attributable to the multi-node communication network 100. As noted previously herein, the CQI value of the in-use channel (e.g., $CQI_{in-use}$) may be based on channel usage and channel degradation which is attributable to the multi-node communication network 100 itself, as well as channel usage and channel degradation which is attributable to outside (e.g., third-party) transmitting devices/networks. Accordingly, the controller 104 may be configured to determine the self-degradation value (SDV) which is indicative of negative effects the multi-node communication network 100 has on the CQI value of the in-use channel (e.g., $CQI_{in-use}$).

In some embodiments, large SDV values may be indicative of large negative effects (e.g., self-degradation effects) attributable to the multi-node communication network 100, whereas small SDV values may be indicative of relatively small negative effects (e.g., self-degradation effects) attributable to the multi-node communication network 100. However, it is further noted herein that any frame of reference may be used.

For example, in embodiments with a dense multi-node communication network 100 with a high data transmission rate, the multi-node communication network 100 may exhibit a large proportion of the total traffic carried out on the in-use channel. Due to the fact that a majority of the traffic and congestion of the in-use channel is attributable to the multi-node communication network 100, a controller 104 of the multi-node communication network 100 may be configured to determine a relatively high self-degradation value (SDV), indicating the multi-node communication network 100 negatively affects the in-use channel to a relatively large extent.

Conversely, by way of another example, in embodiments with a sparse multi-node communication network 100 with a low data transmission rate, the multi-node communication network 100 may exhibit only a small proportion of the total traffic carried out on the in-use channel. In this example, a controller 104 of the multi-node communication network 100 may be configured to determine a relatively low self-degradation value (SDV), indicating the multi-node communication network 100 negatively affects the in-use channel only to a relatively small extent.

It is contemplated herein that various steps/functions of the present disclosure may be carried out by any communication node 102a-102c of the multi-node communication network 100. For example, in some embodiments, a single communication node 102a may be configured to carry out every step associated with dynamic spectrum allocation (DSA) (e.g., determining $CQI_{in-use}$, determining SDV). By way of another example, various steps associated with dynamic spectrum allocation (DSA) may be carried out by different communication nodes 102a-102c of the multi-node communication network 100, then "concentrated" at a single communication node 102n such that the single communication node 102n may be configured to make channel migration decisions for carrying out DSA. For instance, instead of determining $CQI_{in-use}$ and/or SDV on its own, a controller 104n of a communication node 102n may instead be configured to receive these values from other communication nodes 102a-102c of the multi-node communication network 100.

In additional and/or alternative embodiments, a plurality of communication nodes 102a-102n may be configured to analyze potential channel migrations and compare the results. In this regard, multiple communication nodes 102a-102n may be configured to cooperate in a collaborative manner in order to implement channel migrations. For example, the multi-node communication network 100 may be configured to implement a channel migration only if two or more communication nodes 102 (e.g., first communication node 102a, second communication node 102b) both agree that a channel migration would be beneficial, and/or agree on which channel to migrate to.

In embodiments, the controller 104 may be further configured to identify one or more candidate channels different from the in-use channel. As noted previously, candidate channels may include any communication channels operating on a bandwidth different from the bandwidth associated with the in-use channel. For example, the in-use channel may include a first bandwidth of one or more frequencies, and a candidate channel may include a second bandwidth of one or more frequencies different from the first bandwidth. The controller 104 may be configured to identify one or more candidate channels different from the in-use channel using any techniques known in the art.

After identifying one or more candidate channels, the controller 104 may be configured to determine one or more candidate CQI values ($CQI_{candidate}$) of the one or more identified candidate channels. For example, upon identifying two potential candidate channels different from the in-use channel (e.g., first candidate channel, second candidate channel), the controller 104 may be configured to determine a first candidate CQI value ($CQI_{1candidate}$) associated with the first candidate channel, and a second candidate CQI value ($CQI_{2candidate}$) associated with the second candidate channel.

The one or more $CQI_{candidate}$ values associated with the one or more candidate channels may be based on any number of factors including, but not limited to, inbound/outbound traffic logs, traffic patterns, a traffic profiles, a channel utilization metrics, packet error rates, identified delays, known and/or determined topology of the multi-node communication networks transmitting on the one or more candidate channels, densities of the transmitting networks, average traffic values, overheard traffic, jamming effects, noise, and the like. The controller 104 may be configured to determine the one or more $CQI_{candidate}$ values using any techniques known in the art.

In some embodiments, the multi-node communication network 100 may be configured to transmit and/or receive data exclusively, or at least primarily, on a single channel at a single moment in time. In these embodiments, $CQI_{candidate}$ values of candidate channels should ideally not exhibit any channel degradation which is attributable to the multi-node communication network 100. Thus, the one or more $CQI_{candidate}$ of the one or more identified candidate channels may be attributable to channel usage and/or channel traffic of third-party transmitting devices and/or third-party communication networks.

In order to effectively compare the CQI value of the in-use channel (e.g., $CQI_{in\text{-}use}$) (which is based on traffic of both the multi-node communication network 100 as well as third-party transmitting devices/networks), with the one or more candidate CQI values ($CQI_{candidate}$) (which are ideally based only on traffic of third-party transmitting devices/networks), it is necessary to adjust either the $CQI_{in\text{-}use}$ value or the one or more $CQI_{candidate}$ values. Thus, in some embodiments, the controller 104 may be configured to determine one or more adjusted CQI values of the in-use channel (e.g., $CQI_{ADJ\ in\text{-}use}$) or the one or more candidate channels (e.g., $CQI_{ADJ\ candidate}$) in order to account for the self-degradation value (SDV) of the multi-node communication network 100 which is present in the in-use channel, but not the one or more candidate channels.

Accordingly, in some embodiments, the controller 104 may be configured to determine one or more adjusted candidate CQI values ($CQI_{ADJ\ candidate}$) of the one or more candidate channels, or an adjusted in-use CQI value ($CQI_{ADJ\ in\text{-}use}$) of the in-use channel. This may be done by adding a determined self-degradation value (SDV) to the CQI value of the in-use channel (e.g., $CQI_{in\text{-}use}$), or subtracting the determined self-degradation value (SDV) from the CQI values of the one or more candidate channels. For example, adjusted in-use CQI values ($CQI_{ADJ\ in\text{-}use}$) of the in-use channel and adjusted CQI values ($CQI_{ADJ\ candidate}$) of the one or more candidate channels may be defined by Equation 1 and Equation 2, respectively:

$$CQI_{ADJ\ in\text{-}use} = CQI_{in\text{-}use} + SDV \quad (1)$$

$$CQI_{ADJ\ candidate} = CQI_{candidate} - SDV \quad (2)$$

In embodiments, the controller 104 may be configured to determine a one or more CQI difference values ($CQI_{diff}$). $CQI_{diff}$ values may be calculated as differences between a channel quality of the in-use channel and a channel quality of a candidate channel after one or the other has been adjusted to account for self-degradation (e.g., adjusted by SDV). In this regard, the one or more $CQI_{diff}$ values may include a difference between $CQI_{in\text{-}use}$ and $CQI_{ADJ\ candidate}$, or a difference between $CQI_{candidate}$ and $CQI_{ADJ\ in\text{-}use}$. For instance, the one or more $CQI_{diff}$ values may be defined by Equation 3 or Equation 4:

$$CQI_{diff} = CQI_{ADJ\ candidate} - CQI_{in\text{-}use} \quad (3)$$

$$CQI_{diff} = CQI_{candidate} - CQI_{ADJ\ in\text{-}use} \quad (4)$$

The controller 104 may be configured to calculate $CQI_{diff}$ values for each of the one or more candidate channels. For example, upon identifying three candidate channels, the controller 104 may be configured to determine a first CQI difference value ($CQI_{1\ diff}$) for the first candidate channel, a second CQI difference value for the second candidate channel ($CQI_{2diff}$), and a third CQI difference value for the third candidate channel ($CQI_{3diff}$). By determining a separate $CQI_{diff}$ values for each respective candidate channel, the controller 104 may be configured to identify relative channel quality differences between the in-use channel and each respective candidate channel, as well as perceived channel quality differences between each candidate channel.

As noted previously herein, there may be computational and procedural costs associated with a channel migration. For example, in order to perform a channel migration, controllers 104 of the multi-node communication network must perform network management coordinate changes and other network management processes. These increased overhead processing requirements result in increased network traffic. Moreover, communication nodes 102 may be inadvertently dropped (e.g., lost) throughout the channel migration, leading to increased route recovery times. Taken together, these practical limitations associated with channel migrations may result in a channel migration that results in an overall decrease in network efficiency, even in cases where the candidate channel (e.g., "migrated-to" channel) exhibits a higher quality than the previously in-use channel (e.g., "migrated-from" channel). As a result, a channel migration may only result in a net-positive outcome for a multi-node communication network 100 if a channel quality of a candidate channel is greater than a channel quality of the in-use channel by some pre-defined CQI threshold value (e.g., $CQI_{thresh}$).

Accordingly, in some embodiments, the controller 104 may be configured to continue transmitting and/or receiving data packets on the currently in-use channel if the one or more $CQI_{diff}$ values do not exceed a CQI threshold value ($CQI_{thresh}$). In other words, the controller 104 may be configured to continue using the in-use channel if each $CQI_{diff} \leq CQI_{thresh}$. Conversely, the controller 104 may be configured to transmit and/or receive data packets on a candidate channel of the one or more candidate channels if at least one $CQI_{diff}$ value exceeds the $CQI_{thresh}$ value. In other words, the controller 104 may be configured to perform a channel migration if $CQI_{diff} > CQI_{thresh}$.

When determining whether to implement a channel migration, the controller 104 may be configured to compare each of the $CQI_{diff}$ values associated with each of the one or more identified candidate channels. For example, if a first CQI difference value ($CQI_{1\ diff}$) associated with a first candidate channel and a second CQI difference value ($CQI_{2\ diff}$) associated with a second candidate channel each exceed the CQI threshold value ($CQI_{thresh}$) (e.g., $CQI_{1\ diff} > CQI_{thresh}$, or $CQI_{2\ diff} > CQI_{thresh}$), the controller 104 may be configured to perform a channel migration to the channel with the greater $CQI_{diff}$ value.

In embodiments, the memory 106 of each communication node 102 may be configured to store respective values collected and/or generated throughout the present disclosure. For example, the memory 106 may be configured to store $CQI_{in\text{-}use}$ values, self-degradation values (SDV), $CQI_{candidate}$ values, or the adjusted CQI values ($CQI_{ADJ\ candidate}$, $CQI_{ADJ\ in\text{-}use}$), $CQI_{diff}$ values, $CQI_{thresh}$ values, and the like.

It may be appreciated that channel traffic, and therefore CQI values, may vary over time. For example, a prospective channel migration from an in-use channel to a candidate channel may not be productive/beneficial at a first time. However, declining $CQI_{in\text{-}use}$ value and/or increasing $CQI_{candidate}$ values may subsequently render the prospective channel migration productive/beneficial at a second time subsequent to the first time. In this regard, communication nodes 102 of the multi-node communication network 100 may be configured to identify $CQI_{diff}$ values between the in-use channel and one or more candidate channels at multiple points in time. A controller 104 may be configured to identify $CQI_{in\text{-}use}$ values, $CQI_{candidate}$ values, adjusted CQI values (e.g., $CQI_{ADJ\ candidate}$, $CQI_{ADJ\ in\text{-}use}$), and $CQI_{diff}$ values at regular or irregular time intervals in order to monitor the productivity of potential channel migrations over time.

For example, a multi-node communication network 100 may be operating on a first channel. At a first time, a controller 104 of a communication node 102 may be configured to: determine an in-use channel quality indicator (CQI) value ($CQI_{in\text{-}use}$) of the in-use channel at the first time; determine a self-degradation value (SDV) indicative of channel quality degradation attributable to the multi-node communication network at the first time; determine a candidate CQI value ($CQI_{candidate}$) of an identified candidate at the first time; determine a first CQI difference value ($CQI_{1\,diff}$) at a first time, and compare the CQI difference value ($CQI_{1\,diff}$) with a CQI threshold value ($CQI_{thresh}$) at the first time. In this regard, the controller 104 may be configured to analyze a potential channel migration from the in-use channel to the candidate channel at the first time.

Continuing with the same example, the controller 104 may be configured to analyze a potential channel migration from the in-use channel to the candidate channel at a second time subsequent to the first time. In this regard, the controller 104 may be configured to: determine a $CQI_{in\text{-}use}$ value of the in-use channel at the second time subsequent to the first time; determine a $CQI_{candidate}$ value of the candidate channel at the second time; determine a $CQI_{1\,diff}$ value at the second time; and compare the $CQI_{1\,diff}$ value with the $CQI_{thresh}$ value at the second time.

It is contemplated herein that evaluating potential channel migrations at regular and/or irregular intervals may allow the system and method of the present disclosure to constantly/consistently identify channel migrations which may improve the efficiency of the multi-node communication network 100. Moreover, by consistently monitoring potential channel migrations to multiple channels, the multi-node communication network 100 may ensure channel migrations are made to the most productive/efficient channel.

As noted previously herein, a controller 104 may be configured to receive one or more values determined throughout the present disclosure from one or more additional communication nodes 102. For example, a controller 104a of a first communication node 102a may be configured to analyze potential channel migrations between an in-use channel and a first candidate channel. In this regard, the controller 104a may be configured to: determine a $CQI_{in\text{-}use}$ value of the in-use channel at the first time; determine a self-degradation value (SDV) indicative of channel quality degradation effects attributable to the multi-node communication network at the first time; determine a $CQI_{candidate}$ value of an identified candidate at the first time; determine a first CQI difference value ($CQI_{1\,diff}$) at a first time, and compare the $CQI_{1\,diff}$ value with a $CQI_{thresh}$ value at the first time.

Continuing with the same example, a controller 104b of a second communication node 102b may be configure to analyze potential channel migrations between an in-use channel and a second candidate channel different from the first candidate channel. In this regard, the controller 104a may be configured to: receive an additional candidate CQI value ($CQI_{2\,candidate}$) of a second candidate channel from the second communication node 102b; determine a second CQI difference value ($CQI_{2\,diff}$) between the second candidate channel and the in-use channel, and compare the $CQI_{2\,diff}$ value with the CQI threshold value ($CQI_{thresh}$) at the first time.

It is contemplated herein that various values (e.g., CQI values, SDV values, and the like) may be computed, transmitted, and received by various communication nodes 102 of the multi-node communication network 100. Moreover, it is contemplated herein that multiple communication nodes 102 may be configured to analyze potential channel migrations. In this regard, embodiments of the present disclosure which are described as being carried out by a single controller 104 may be regarded as being carried out by multiple controllers 104 of multiple communication nodes 102.

Figure 2:
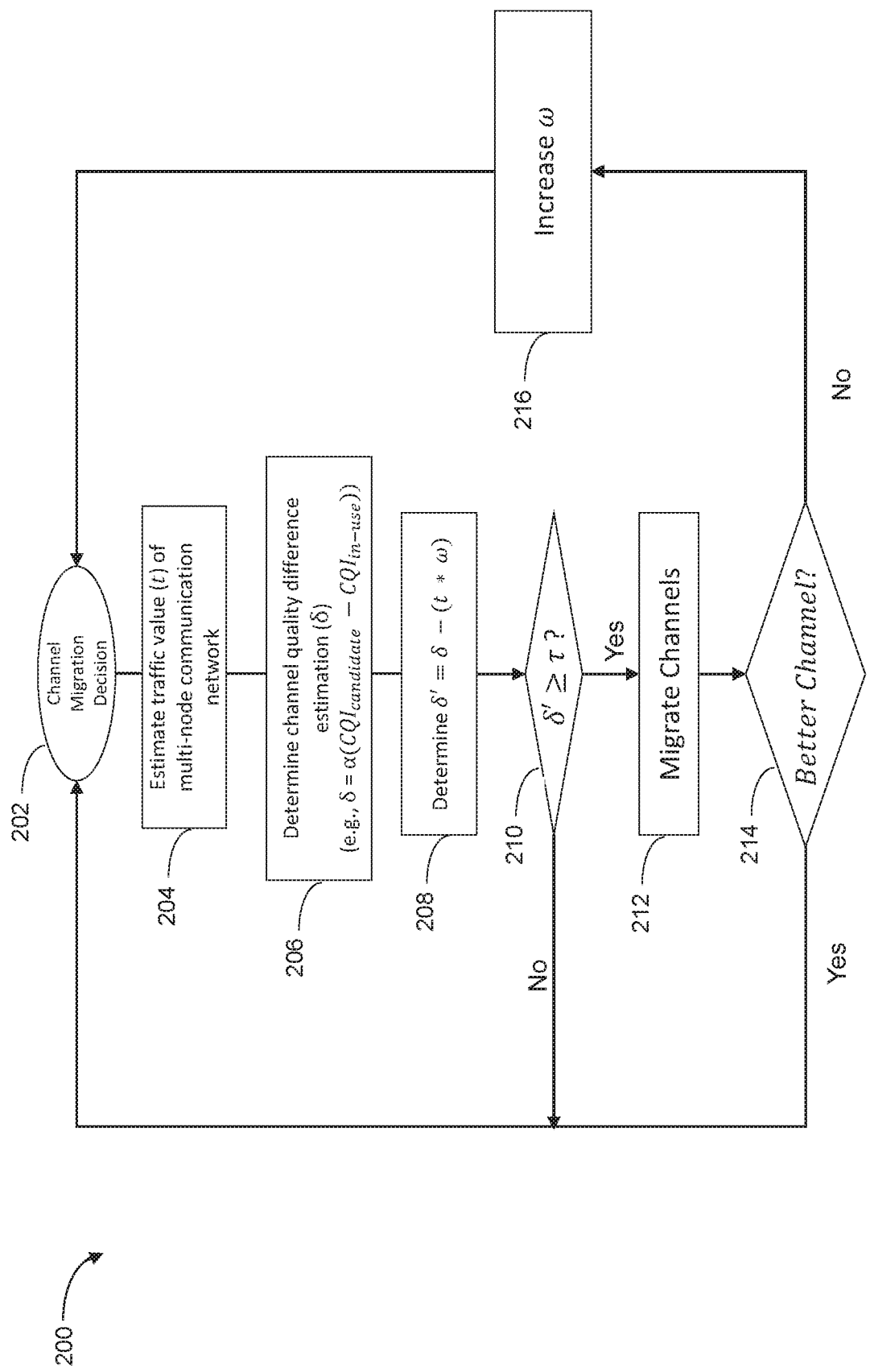
FIG. 2 illustrates a flowchart of a method for determining self-degradation effects of a multi-node communication network, in accordance with one or more embodiments of the present disclosure.

FIG. 2 illustrates a flowchart of a method 200 for determining self-degradation effects of a multi-node communication network 100, in accordance with one or more embodiments of the present disclosure. It is noted herein that the steps of method 200 may be implemented all or in part by multi-node communication network 100. It is further recognized, however, that the method 200 is not limited to the multi-node communication network 100 in that additional or alternative system-level embodiments may carry out all or part of the steps of method 200.

In particular, it is contemplated herein that method 200 may enable a multi-node communication network 100 to determine self-degradation effects attributable to the multi-node communication network 100 when this determination may otherwise not be made. For example, if a controller 104 is not able to determine network topography, noise, or other metrics required to determine a self-degradation value (SDV) indicative of channel quality degradation effects attributable to the multi-node communication network 100, the controller 104 may be configured to perform steps of method 200 in order to identify self-degradation effects of the multi-node communication network 100. Accordingly, method 200 may be used to estimate, approximate, or otherwise determine self-degradation effects of a multi-node communication network.

In a step 202, a channel migration decision is to be made. For example, as described previously herein, a controller 104 of a communication node 102 of a multi-node communication network 100 may be configured to evaluate potential channel migrations at regular and/or irregular intervals. By constantly and/or consistently evaluating potential channel migrations, the multi-node communication network may ensure channel migrations are made to the most productive/efficient channel, and at times which are productive/efficient for the multi-node communication network 100.

In a step 204, an on-going traffic value (t) of the multi-node communication network is estimated. For example, the on-going traffic value (t) may be estimated to be a number between of n different values. For instance, on-going traffic values (t) may be selected to be between 0 and 3 (e.g., n=4), wherein t=0 indicates the channel is under-utilized, t=1 indicates the channel is moderately utilized, t=2 indicates the channel is heavily utilized, and t=3 indicates the channel is over-utilized. It is noted herein that the on-going traffic value (t) may be an arbitrary estimation of on-going traffic, and that the value t may be selected from any n values.

In a step 206, a channel quality difference estimation (δ) is determined. As noted previously herein, a channel quality difference estimation (δ) may be based on a difference between channel quality indicator (CQI) values of the in-use channel and a prospective candidate channel. For example, a channel quality difference estimation (δ) may be defined according to Equation 5:

$$\delta = \alpha(CQI_{candidate} - CQI_{in\text{-}use}) \quad (5)$$

wherein δ is the channel quality difference estimation, $CQI_{in\text{-}use}$ is the channel quality indicator (CQI) value of the currently in-use channel, $CQI_{candidate}$ is the CQI value of a candidate channel, and α is a constant. As noted previously herein, the CQI values of the in-use channel and the candidate channel may be estimated using any network characteristics known in the art.

In a step 208, an adjusted channel quality difference estimation (δ') is determined. In embodiments, an adjusted channel quality difference estimation (δ') may be determined by multiplying the estimated on-going traffic value (t) of the multi-node communication network 100 by some self-degradation weight value (ω) to determine a self-degradation value SDV (e.g., SDV=t*ω), and subtracting the SDV value from the channel quality difference estimation (δ). For example, the adjusted channel quality difference estimation (δ') may be determined according to Equation 6:

$$\delta' = \delta - (t^*\omega) \quad (6)$$

wherein the value (t*ω) represents a self-degradation value SDV indicative of self-degradation effects attributable to the multi-node communication network (e.g., SDV=t*ω).

In embodiments, the weight value (ω) of the estimated on-going traffic value is selected such that $$0 \le \omega \le \frac{\delta}{\text{Max}(t)}.$$

For example, where the on-going traffic value (t) is selected to be between 0 and 3 (e.g., n=4), the weight value (ω) of the estimated on-going traffic value is selected such that 0≤ω≤δ/3.

In a step 210, it is determined whether the adjusted channel quality difference estimation (δ') is greater than or equal to some pre-defined threshold value (τ). For example, the controller 104 may be configured to determine whether δ'≥τ. In some embodiments, adjusted channel quality difference estimations which are greater than or equal to the threshold value (e.g., δ'≥τ) may indicate performing a channel migration may be effective/beneficial for the multi-node communication network 100. Conversely, in some embodiments, adjusted channel quality difference estimations which are not greater than or equal to the threshold value (e.g., δ'<τ) may indicate performing a channel migration may not be effective/beneficial for the multi-node communication network 100.

It is noted herein that method 200 may represent an iterative approach to determining a weight value (ω) associated with the traffic (t) of the multi-node communication network 100 in order to determine the extent of channel congestion/traffic on a particular channel is attributable to the multi-node communication network 100 (e.g., (e.g., SDV). In this regard, when a controller 104 is first beginning to determine self-degradation effects via method 200, the controller 104 may initially set the weight value to zero (e.g., ω=0) for the first iteration, or "pass," through method 200. By initially setting the weight value to zero, and slowly increasing ω as channel migrations are made, the controller 104 may be configured to determine how much traffic "follows" the multi-node communication network 100 through the channel migrations, and may therefore iteratively determine how much traffic (e.g., self-degradation) is attributable to the multi-node communication network 100. In this regard, method 200 may be configured to carry out an iterative approach to determine a self-degradation value (SDV) of the multi-node communication network 100.

If δ'<τ in step 210, method 200 may proceed back to step 202. If δ'<τ on the first iteration (e.g., "pass") through method 200, this may indicate that the multi-node communication network 100 may not benefit from a channel migration at the instant time. Thus, by looping back to step 202, method 200 may perform another channel migration analysis at a subsequent time.

If δ'≥τ in step 210, method 200 may proceed to step 212. In a step 212, a channel migration is initiated. For example, the controller 104 of a multi-node communication network 100 may determine a channel migration would be beneficial for the multi-node communication network 100, and may therefore initiate a channel migration from the in-use channel (e.g., first channel) to the candidate channel (e.g., second channel).

In a step 214, it is determined whether the migrated-to channel (e.g., second channel, original candidate channel) exhibits superior performance as compared to the migrated-from channel (e.g., first channel, original in-use channel). It is contemplated herein that a controller 104 may be configured to use any network characteristics known in the art to carry out the determination in step 214 including, but not limited to, a packet error rate, a channel utilization metric, network delays, and the like.

If the answer to step 214 is "Yes," method 200 may proceed back to step 202. Determining "Yes" in step 214 may indicate that the weight value (ω) (and therefore SDV value) used in step 208 resulted in an effective channel migration. This may indicate that the weight value (ω) need not be adjusted at the current time.

If the answer to step 214 is "No," method 200 may proceed back to a step 216. Determining "No" in step 214 may indicate that the weight value (ω) (and therefore SDV value) used in step 208 did not result in an effective channel migration. This may indicate that the controller 104 underestimated the self-degradation effects of the multi-node communication network 100. In other words, determining "No" in step 214 may indicate that the multi-node communication network 100 is responsible for more traffic than was originally estimated (e.g., self-degradation), and that the weight value (ω) used in step 208 must be increased (e.g., SDV must be increased).

In a step 216, the weight value (ω) is increased. For example, the controller 104 may adjust the weight value (ω) to generate an adjusted weight value (ω'), wherein the adjusted weight value (ω') is greater than the weight value (ω) (e.g., ω'>ω). By iteratively increasing the weight value (ω) associated with the estimated traffic value (t) of the multi-node communication network 100, a controller 104 may be configured to gradually increase the estimation of self-degradation effects (e.g., increase SDV)) as channel migrations are made to see how much "traffic" the multi-node communication network 100 brings along with it. For instance, during a second iteration, or "pass," through method 200, in which a controller 104 effects a channel migration from the second channel to a third channel, the controller 104 may be configured to determine whether the third channel exhibits better performance than the second channel in step 214, and adjust the weight value (ω) dependent upon that determination.

In this regard, the controller 104 may be configured to perform several iterations, or "passes," through method 200 in order to iteratively determine the weight value (ω) associated with the multi-node communication network 100. For example, the controller 104 may be configured to iteratively increase weight values used in step 208 to generate adjusted weight values (ω'), such that a first adjusted weight value (ω') is greater than the initial weight value (ω), a second adjusted weight value (ω") is greater than the first adjusted weight value (ω'), and the like (e.g., ω">ω'>ω).

In some embodiments, method 200 may include an asynchronous timer configured to configured to reset the weight value over time in order to accommodate for changes in the multi-node communication network 100. For example, the controller 104 may be configured to maintain a timer in memory 106, wherein the controller 104 is configured to reset the weight value (ω) upon expiration of the timer, and reset the timer each time the weight value (ω) is increased. For instance, upon expiration of the timer after a predetermined amount of time, the controller 104 may be configured to "reset" the weight value (ω) to zero, such that method 200 may be re-started (e.g., re-start on a first iteration through method 200). Conversely, upon increasing the weight value (ω), the controller 104 may be configured to re-set the timer, thereby enabling further iterations through method 200.

In embodiments, the controller 104 may be configured to determine an accurate weight value (ω) when method 200 regularly and/or consistently performs effective channel migrations (e.g., when the answer to step 214 is regularly and/or consistently "Yes"). A determined value (ω) may then be used to determine a self-degradation value (SDV) indicative of channel quality degradation attributable to the multi-node communication network 100.

Figure 3A:
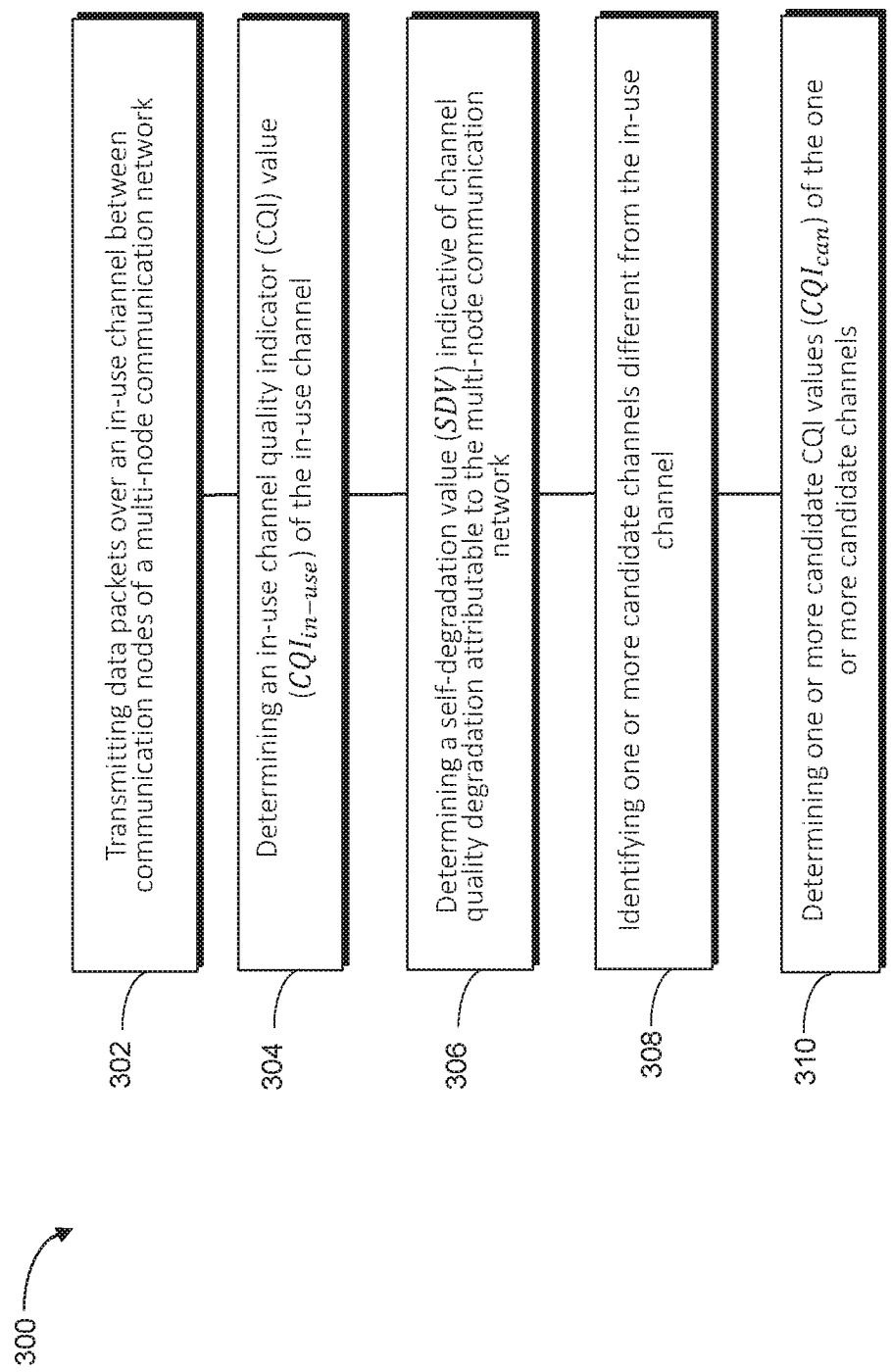
FIG. 3A illustrates a flowchart of a method for utilizing self-degradation in dynamic spectrum allocation (DSA), in accordance with one or more embodiments of the present disclosure.
Figure 3B:
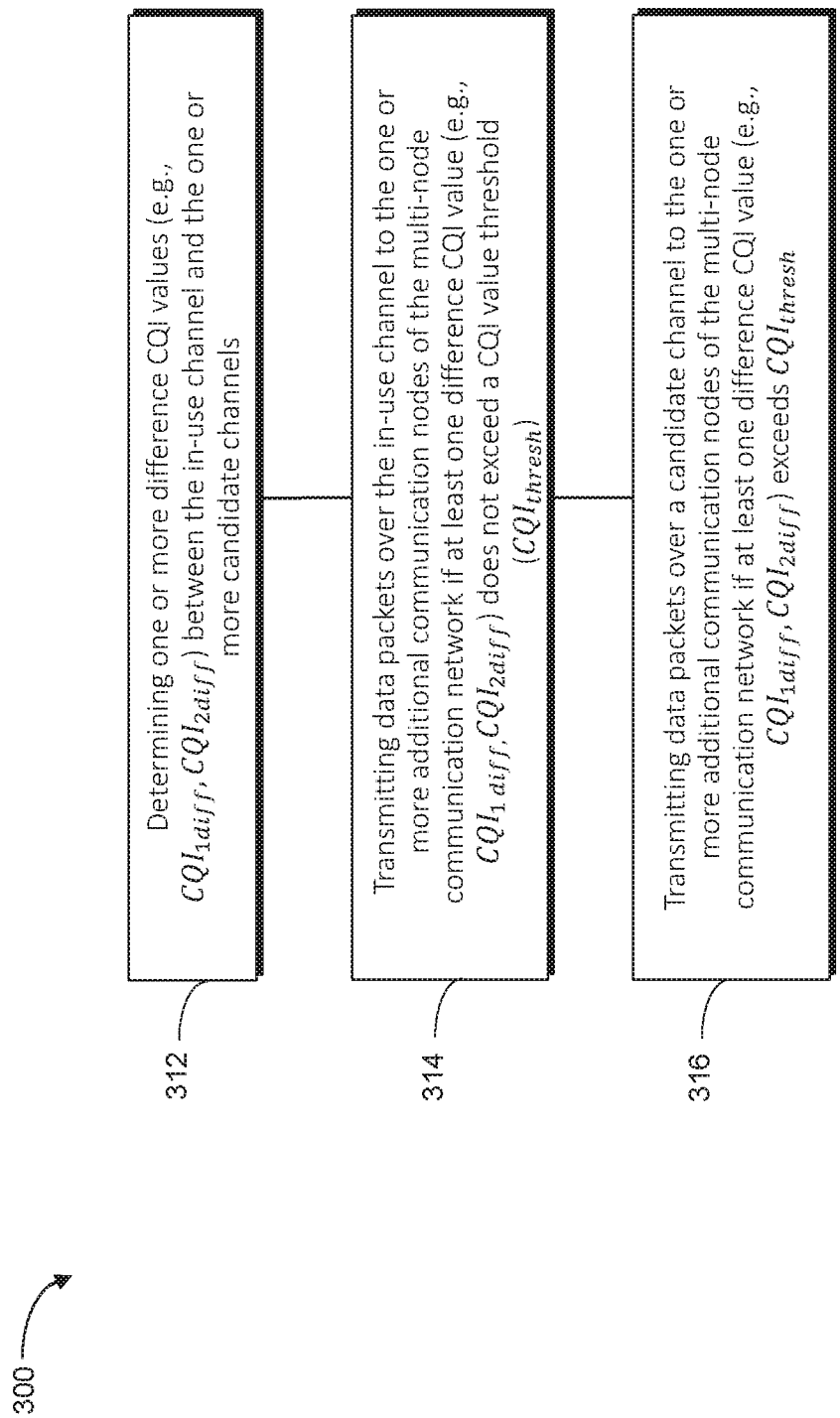
FIG. 3B illustrates a flowchart of a method for utilizing self-degradation in dynamic spectrum allocation (DSA), in accordance with one or more embodiments of the present disclosure.

FIG. 3A illustrates a flowchart of a portion of a method for utilizing self-degradation in dynamic spectrum allocation (DSA), in accordance with one or more embodiments of the present disclosure. FIG. 3B illustrates a flowchart of a portion of the method 300 for utilizing self-degradation in dynamic spectrum allocation (DSA), in accordance with one or more embodiments of the present disclosure. It is noted herein that the steps of method 300 may be implemented all or in part by multi-node communication network 100. It is further recognized, however, that the method 300 is not limited to the multi-node communication network 100 in that additional or alternative system-level embodiments may carry out all or part of the steps of method 300.

In a step 302, data packets are transmitted over an in-use channel between communication nodes of a multi-node communication network. For example, as shown in FIG. 1, communication nodes 102a-102c of a multi-node communication network 100 may be configured to transmit and/or receive data packets, via communication interface 108a-108c, over an in-use channel.

In a step 304, an in-use channel quality indicator (CQI) value ($CQI_{in-use}$) of the in-use channel is determined. For example, the controller 104 of a communication node 102 may be configured to determine $CQI_{in-use}$ of the in-use channel at a first time. CQI values of the present disclosure may include any value, metric, or other indicator which is indicative of a quality of the respective channel. For example, CQI values of the present disclosure (e.g., $CQI_{in-use}$, and the like)) may be represented as a noise factor (NF) value. Further, the controller 104 may be configured to determine CQI values (e.g., $CQI_{in-use}$) may be based on any number of factors including, but not limited to, inbound/outbound traffic logs, traffic patterns, a traffic profile of the multi-node communication network, a channel utilization metric, packet error rates, identified delays, and the like.

In a step 306, a self-degradation value (SDV) indicative of channel quality degradation attributable to the multi-node communication network is determined. For example, the controller 104 may be configured to determine the self-degradation value (SDV) which is indicative of negative effects the multi-node communication network 100 has on the $CQI_{in-use}$ value.

In a step 308, one or more candidate channels different from the in-use channel are identified. For example, the controller 104 may be configured to identify one or more candidate channels different form the in-use channel. As noted previously, candidate channels may include any communication channels which are distinguishable from the in-use channel via one or more characteristics including, but not limited to, a frequency, a modulation method, a key, and the like. The controller 104 may be configured to identify one or more candidate channels different from the in-use channel using any techniques known in the art.

In a step 310, one or more candidate CQI values ($CQI_{can}$) of the one or more candidate channels are determined. For example, upon identifying two potential candidate channels different from the in-use channel (e.g., first candidate channel, second candidate channel), the controller 104 may be configured to determine a first candidate CQI value ($CQI_{1\ candidate}$) associated with the first candidate channel, and a second candidate CQI value ($CQI_{2\ candidate}$) associated with the second candidate channel.

In a step 312, one or more difference CQI values (e.g., $CQI_{1\ diff}, CQI_{2\ diff}$) between the in-use channel and the one or more candidate channels are determined. For example, upon identifying a first candidate channel and a second candidate channel, the controller may be configured to determine a first difference CQI value ($CQI_{1\ diff}$) between the in-use channel and the first candidate channel, and a second difference CQI value ($CQI_{2\ diff}$) between the in-use channel and the second candidate channel.

As noted previously herein, $CQI_{diff}$ values may be calculated as differences between a channel quality of the in-use channel and a channel quality of a candidate channel after one or the other has been adjusted to account for self-degradation (e.g., adjusted by SDV). In this regard, the one or more $CQI_{diff}$ values may include a difference between $CQI_{in-use}$ and a $CQI_{ADJ\ candidate}$ value of a candidate channel, or a difference between $CQI_{candidate}$ and an $CQI_{ADJ\ in-use}$ value of the in-use channel. For instance, the one or more $CQI_{diff}$ values may be defined by Equation 3 or Equation 4 above.

In a step 314, data packets are transmitted over the in-use channel to the one or more additional communication nodes of the multi-node communication network if at least one difference CQI value (e.g., $CQI_{1\ diff}, CQI_{2\ diff}$) does not exceed a CQI value threshold ($CQI_{thresh}$). For example, if the controller 104 determines that no difference CQI value of the one or more difference CQI values exceeds a CQI value threshold, the controller 104 may be configured to determine that a channel migration may not be beneficial/productive for the multi-node communication network 100, and may therefore cause the communication nodes 102 of the multi-node communication network 100 to continue utilizing the in-use channel.

In a step 316, data packets are transmitted over a candidate channel to the one or more additional communication nodes of the multi-node communication network if at least one difference CQI value (e.g., $CQI_{1\ diff}, CQI_{2\ diff}$) exceeds $CQI_{thresh}$. For example, if the controller 104 determines that the $CQI_{1\ diff}$ value associated with the first candidate channel exceeds the CQI value threshold, the controller 104 may be configured to determine that a channel migration may be beneficial/productive for the multi-node communication network 100, and may therefore initiate a channel migration from the in-use channel to the first candidate channel.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A communication node of a multi-node communication network, the communication node comprising:
    a communication interface; and
    a controller communicatively coupled to the communication interface, the controller configured to:
        transmit one or more data packets, via the communication interface, over an in-use channel to one or more additional communication nodes of the multi-node communication network;
        determine an in-use channel quality indicator (CQI) value ($CQI_{in\text{-}use}$) of the in-use channel at a first time;
        determine a self-degradation value (SDV) indicative of channel quality degradation attributable to the multi-node communication network;
        determine a candidate CQI value ($CQI_{candidate}$) of an identified candidate channel different from the in-use channel;
        determine a first CQI difference value ($CQI_{1diff}$) at the first time, wherein $CQI_{1diff}$ comprises at least one of a difference between $CQI_{in\text{-}use}$ and an adjusted candidate CQI value ($CQI_{ADJ\ candidate}$) of the candidate channel, or a difference between $CQI_{candidate}$ and an adjusted in-use CQI value ($CQI_{ADJ\ in\text{-}use}$) of the in-use channel;
        transmit one or more data packets, via the communication interface, over the in-use channel to the one or more additional communication nodes of the multi-node communication network if $CQI_{1diff}$ does not exceed a CQI threshold value ($CQI_{thresh}$); and
        transmit one or more data packets, via the communication interface, over the candidate channel to the one or more additional communication nodes of the multi-node communication network if $CQI_{1diff}$ exceeds $CQI_{thresh}$.

2. The communication node of claim 1, wherein the in-use channel is distinguishable from the candidate channel via at least one of a frequency, a modulation method, or a key.

3. The communication node of claim 1, wherein $CQI_{ADJ\ in\text{-}use} = CQI_{in\text{-}use}$ SDV.

4. The communication node of claim 1, wherein $CQI_{ADJ\ candidate} = CQI_{candidate}$ SDV.

5. The communication node of claim 1, wherein $CQI_{1diff} = CQI_{ADJ\ candidate} - CQI_{in\text{-}use}$.

6. The communication node of claim 1, wherein $CQI_{1diff} = CQI_{candidate} - CQI_{ADJ\ in\text{-}use}$.

7. The communication node of claim 1, further including a memory configured to store at least one of the $CQI_{in\text{-}use}$ value, SDV, or the $CQI_{candidate}$ value.

8. The communication node of claim 1, wherein $CQI_{in\text{-}use}$ is based on at least one of a density of the multi-node communication network, a traffic profile of the multi-node communication network, a packet error rate, a channel utilization metric, or a radio frequency (RF) energy level.

9. The communication node of claim 1, wherein the controller is further configured to:
    receive an additional candidate CQI value ($CQI_{2candidate}$) of an additional candidate channel from an additional communication node of the one or more additional communication nodes of the multi-node communication network;
    determine a second CQI difference value ($CQI_{2\ diff}$), wherein $CQI_{2\ diff}$ comprises at least one of a difference between $CQI_{in\text{-}use}$ and an adjusted candidate CQI value ($CQI_{2\ ADJ\ candidate}$) of the additional candidate channel, or a difference between a CQI value of the additional candidate channel ($CQI_{candidate}$) and the adjusted in-use CQI value ($CQI_{ADJ\ in\text{-}use}$) of the in-use channel;
    transmit one or more data packets over the in-use channel to the one or more additional communication nodes of the multi-node communication network if $CQI_{2diff}$ does not exceed $CQI_{thresh}$; and
    transmit one or more data packets over the additional candidate channel to the one or more additional communication nodes of the multi-node communication network if $CQI_{2diff}$ exceeds $CQI_{thresh}$.

10. The communication node of claim 1, wherein the controller is further configured to:
    determine an in-use CQI value ($CQI_{in\text{-}use}$) of the first channel at a second time subsequent to the first time;
    determine a candidate channel CQI value ($CQI_{candidate}$) of the candidate channel at the second time;
    determine the first CQI difference value ($CQI_{1diff}$) at the second time;
    transmit one or more data packets over the in-use channel to the one or more additional communication nodes of the multi-node communication network if $CQI_{1diff}$ at the second time does not exceed $CQI_{thresh}$; and
    transmit one or more data packets over the candidate channel to the one or more additional communication nodes of the multi-node communication network if $CQI_{1diff}$ at the second time exceeds $CQI_{thresh}$.

11. The communication node of claim 1, wherein determining a self-degradation value (SDV) indicative of channel quality degradation attributable to the multi-node communication network comprises:
    estimating a traffic value, t, attributable to traffic of the multi-node communication network;
    determining a channel quality difference estimation, $\delta_1$, between a first channel and a second channel, wherein $\delta$ comprises a difference between a CQI value of the first channel ($CQI_1$) and a CQI value of the second channel ($CQI_2$);
    determining an adjusted channel quality difference estimation, $\delta_1'$, between the first channel and the second channel, wherein $\delta_1' = \delta_1 - (t^*\omega)$, wherein $\omega$ comprises a self-degradation weight value;
    adjusting a transmission frequency to change from the first channel to the second channel; and
    determining if the second channel is a better channel for transmitting data within the multi-node communication network than the first channel.

12. The communication node of claim 11, wherein the controller is further configured to:
    adjust $\omega$ if the controller determines the second channel is not better than the first channel to generate an adjusted self-degradation weight value, $\omega'$;
    determine a channel quality difference estimation, $\delta_2$, between the second channel and a third channel, wherein $\delta_2$ comprises a difference between $CQI_2$ and a CQI value of the third channel ($CQI_3$);

determine an adjusted channel quality difference, $\delta'_2$, between the second channel and the third channel, wherein $\delta'_2=\delta_2-(t*\omega')$;

adjust a transmission frequency to change from the second channel to the third channel; and determine if the third channel is a better channel for transmitting data within the multi-node communication network than the second channel.

13. The communication node of claim 12, wherein the controller is further configured to:

adjust $\omega'$ if the controller determines the third channel is not better than the second channel to generate an adjusted self-degradation weight value, $\omega''$.

14. The communication node of claim 12, wherein adjusting $\omega$ to generate an adjusted self-degradation weight value, $\omega'$, comprises:

increasing $\omega$ to generate the adjusted self-degradation weight value, $\omega'$, such that $\omega'>\omega$.

15. A method for transmitting data within a multi-node communication network, comprising:

transmitting one or more data packets over an in-use channel between communication nodes of a multi-node communication network;

determining an in-use channel quality indicator (CQI) value ($CQI_{in-use}$) of the in-use channel;

determining a self-degradation value (SDV) indicative of channel quality degradation attributable to the multi-node communication network;

identifying one or more candidate channels different from the in-use channel;

determining one or more candidate CQI values ($CQI_{candidate}$) of the one or more candidate channels;

determining a first CQI difference value ($CQI_{1diff}$), wherein $CQI_{1diff}$ comprises at least one of a difference between $CQI_{in-use}$ and an adjusted candidate CQI value ($CQI_{ADJ\ candidate}$) of the candidate channel, or a difference between $CQI_{candidate}$ and an adjusted in-use CQI value ($CQI_{ADJ\ in-use}$) of the in-use channel;

transmitting one or more data packets over the in-use channel to the one or more additional communication nodes of the multi-node communication network if $CQI_{1diff}$ does not exceed a CQI threshold value ($CQI_{thresh}$); and transmitting one or more data packets over the candidate channel to the one or more additional communication nodes of the multi-node communication network if $CQI_{1diff}$ exceeds $CQI_{thresh}$.

* * * * *